United States Patent
Pokhariyal et al.

(10) Patent No.: US 7,203,645 B2
(45) Date of Patent: Apr. 10, 2007

(54) SPEECH RECOGNITION SYSTEM LOADING DIFFERENT RECOGNITION ENGINES FOR DIFFERENT APPLICATIONS

(75) Inventors: Shuvranshu Pokhariyal, Hillsboro, OR (US); Shirish Aundhe, Beaverton, OR (US); Thomas Hernandez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 09/844,288

(22) Filed: Apr. 27, 2001

(65) Prior Publication Data

US 2003/0014251 A1    Jan. 16, 2003

(51) Int. Cl.
*G10L 15/04* (2006.01)

(52) U.S. Cl. ........................ 704/251; 704/275

(58) Field of Classification Search ............... 704/251, 704/275
See application file for complete search history.

(56) References Cited

U.S. PATENT DOCUMENTS

| | | | | |
|---|---|---|---|---|
| 5,513,298 A | * | 4/1996 | Stanford et al. | 704/243 |
| 5,983,190 A | * | 11/1999 | Trower et al. | 704/276 |
| 6,101,473 A | * | 8/2000 | Scott et al. | 704/275 |
| 6,233,559 B1 | * | 5/2001 | Balakrishnan | 704/275 |
| 6,292,668 B1 | * | 9/2001 | Alanara et al. | 455/466 |
| 6,532,444 B1 | * | 3/2003 | Weber | 704/257 |
| 6,748,361 B1 | * | 6/2004 | Comerford et al. | 704/275 |
| 6,839,669 B1 | * | 1/2005 | Gould et al. | 704/246 |
| 6,957,184 B2 | * | 10/2005 | Schmid et al. | 704/257 |
| 6,985,852 B2 | * | 1/2006 | Wang | 704/9 |

OTHER PUBLICATIONS

3rd Generation e-Business Integrated Demo White Paper, e-Business Solutions and Analysis Team; Version 1.0, Aug. 19, 2000.

* cited by examiner

Primary Examiner—Michael N. Opsasnick
(74) Attorney, Agent, or Firm—Fish & Richardson P.C.

(57) ABSTRACT

A speech recognition framework receives information about a recognized phrase from a speech engine. The framework identifies the application that is a focus of the recognized phrase. The framework then selects a handler function based on the recognized phrase and the application. The framework calls the handler function, which responds to the phrase.

30 Claims, 5 Drawing Sheets

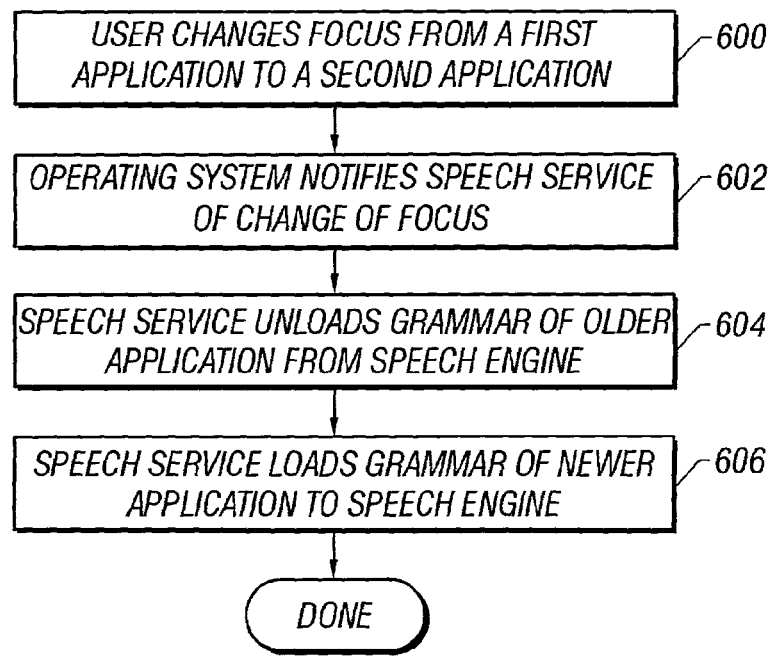

SPEECH RECOGNITION SYSTEM LOADING DIFFERENT RECOGNITION ENGINES FOR DIFFERENT APPLICATIONS

TECHNICAL FIELD

This invention relates to a framework for speech recognition.

BACKGROUND

Sound enabled computers are equipped with a microphone and sound processing equipment, such as a soundcard, that allow the computers to receive sound input. Speech engine software may be installed on sound enabled computers to allow the computers to recognize speech contained within the sound input. The speech typically consists of words or phrases spoken by a user.

Speech-enabled applications, such as dictation software, are equipped to receive speech as input from a user, for example, through a speech engine. The applications typically receive the input through an application-programming interface ("API") of the speech engine. All communication between the speech-enabled application and the speech engine must conform to a syntax that is specified by the speech API.

Different speech engines may have different APIs. Different versions of the same speech-enabled application are sometimes provided for the different APIs. Alternatively, some complex speech-enabled applications are equipped to communicate with more than one speech API.

DESCRIPTION OF DRAWINGS

FIG. 5 shows a speech handler file for a speech enabled application; and

FIG. 6 is a flow chart of the process performed when a user changes focus from one application to another.

DETAILED DESCRIPTION

Figure 1:
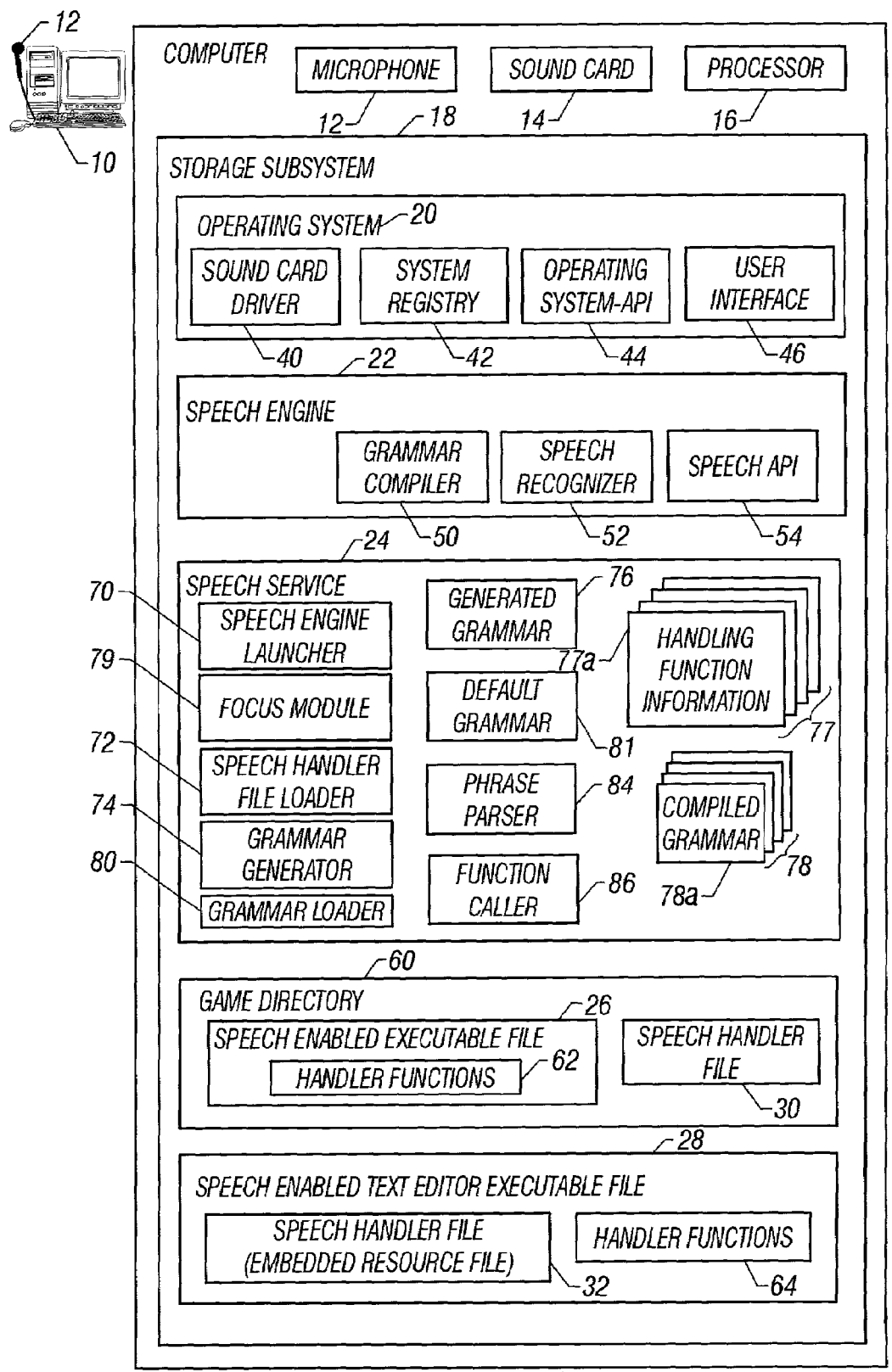
FIG. 1 shows a computer that has speech service software installed.

As shown in FIG. 1, a computer 10 includes a microphone 12 and a sound card 14, which allow the computer 10 to receive sound input from a user operating the computer. The computer also includes a processor 16 and a storage subsystem 18. Storage subsystem 18 is a computer readable medium, such as a, computer memory, a DVDROM, a DVDRAM, a CDROM, a floppy disk, an optical disk, a hard disk, or a hard disk array.

Storage subsystem 18 stores computer software that is executed by processor 16. The computer software includes an operating system 20, a speech engine 22 that recognizes spoken phrases in the sound input, a speech service 24, and two speech-enabled applications 26 and 28. The operating system is typically a Windows™ operating system by Microsoft Inc., although any other operating system such as MACOS™ by Apple Inc. or a UNIX-like operating system (e.g. Linux, AIX™ or Solaris™) may be used instead.

As will be described in greater detail below, the speech service 24 receives recognized phrases from the speech engine 22 and directs them to the relevant one of the speech-enabled applications 26, 28. Speech service 24 selects a handler function that responds to the recognized phrase based on a speech handler file 30, 32 associated with the speech-enabled application 26, 28. Speech service 24 also initializes and configures speech engine 22 based on the speech handler files 30, 32. The speech handler files 30, 32 are described in greater detail below with reference to FIG. 5.

Thus speech enabled applications 26, 28 interact with the speech engine 22 through the speech service 24, which is configured to communicate with the API 54 of the speech engine 22. As will be described below, the speech service 24 uses the same speech handler file 30, 32 irrespective of the API 54 of the speech engine 22. Consequently, the speech service 24 allows a single version of a speech-enabled application 26, 28 to be used with any speech API that is supported by the speech service 24.

Operating system 20 includes a sound card driver 40 that provides sound information to the software on the computer 10. The operating system also includes a system registry 42 that contains information on the configuration of the computer 10 and the software installed on it. Certain operating systems may store the configuration information in configuration files instead. The operating system 20 provides an operating system API 44 through which other programs can interact and communicate with the operating system 20.

The user interacts with the computer 10 through a user interface 46 provided by the operating system. User interface 46 is typically a graphical user interface, such as the windows user interface or the X-windows graphical interface, although the speech service may be used in systems with other user interfaces, such as a text user interface or a speech-driven user interface. A user selects a particular application or computer program as the target or "focus" of user input through the user interface 46. The application in focus may, for example, be selected by clicking on an icon associated with the program, by typing a sequence of keys on a keyboard, or saying certain keywords.

Speech engine 22 recognizes spoken phrases based on a grammar provided by the speech service 24. Speech engine 22 comprises code modules that perform the functions described below. Speech engine 22 includes a grammar compiler 50, which compiles the grammar into a binary format that is easily loaded into the speech engine 22. Speech engine 22 also includes a speech recognizer 52 that recognizes spoken phrases in sound information from the sound card driver 40 based on the grammar that has been loaded onto the speech engine. Other software can interact with speech engine 22 through a speech API 54. The API 54 may, for example, be a speech application-programming interface ("SAPI") developed by Microsoft Inc., an advanced speech API ("ASAPI") by AT&T Corporation, or a JAVA™ speech application-programming interface ("JSAPI") by Sun Microsystems.

The first speech-enabled application 26 is a speech-enabled video game. A user plays the video game using speech commands such as "jump" or "kick the monster in the stomach". The user also performs other functions, such as sending mail to the technical support department of the vendor of the application, using audio commands. A user may, for example, say "send mail to technical support" to prepare a letter that is addressed to technical support. Speech-enabled application 26 is stored in a game directory 60 within storage subsystem 18. The game directory 60 also includes the speech handler file 30 of the application 26.

Handler functions 62, which are contained within the first speech enabled application 26, are executed whenever a phrase recognized by the speech engine 22 is directed at the application 26, as described in greater detail below.

The second speech-enabled application 28 is a text editor. A user performs functions associated with entries in the menus of the text editor by audibly stating words corresponding to the functions. The user may, for example, say "save file" to save a file, "open file" to open a file, or "format in bold face" to format text in bold face font. A user also creates the body of a document by speaking the words he would like to include in the body. The user may, for example, begin a letter by saying "Dear Mother. How are you?" The computer 10 recognizes the spoken sounds and provides the text to the text editor as input.

Handler functions 64, contained within the second speech enabled application 28 are executed whenever the speech engine 22 recognizes a phrase that is directed at the second speech enabled application. Unlike the first speech-enabled application 26, the second speech-enabled application 28 has its speech handler file 32 embedded within the executable file of the application 32 as a resource file. The speech service 24 is configured to retrieve the speech handler file 30 from the application 28, as will be described below.

Speech service 24 is a "service" or a "daemon" that does not does not interact with the user through the user interface 46 and is, typically, executed contemporaneously with other programs on the computer 10. The speech service 24 is automatically started during the startup process of computer 10. Speech service 24 comprises code modules that perform the functions described below.

Speech service 24 includes a speech engine launcher 70 that launches the speech engine 22 when the speech service 24 is first started. All speech-enabled applications 26, 28 configured to use the speech service 24 that are later executed on the computer 10 use the same instance of the speech engine 22 through the speech server. Thus the speech service 24 eliminates additional processing that would otherwise be required to launch the speech engine 22 every time a speech application 26 is executed.

Speech service 24 also includes a speech handler file loader 72 that loads speech handler files 30, 32 and a grammar generator 74 that generates a grammar file 76 and handling function information 77a from each speech handler file 30, 32. The grammar generator 74, for example, generates the grammar file 76 as described in U.S. patent application Ser. No. 09/752,994, titled "Specifying Arbitrary Words In Rule-Based Grammars." The handling function information 77a relates different spoken phrases with corresponding functions that respond to the phrases. Each grammar file 76 informs the speech engine 22 of the different phrases to which a speech-enabled application 26, 28 responds. The grammar is typically a context-free grammar with wild card support, although any grammar supported by the speech engine 22 may be used instead. A sample grammar file is attached as appendix A.

The grammar generator 74 also causes the grammar compiler 50 of the speech engine 22 to compile each grammar file 76, producing compiled grammars 78. Compiled grammars 78 are stored within storage subsystem 18, preferably within a rapidly accessible memory, from where they are later retrieved, as described in greater below. The speech service 24 also includes a default grammar 81 that is loaded into the speech engine 22 when the speech service is first launched.

Speech service 24 further includes a focus module 79, which is notified by the operating system 20 whenever a user changes focus from one application to another. Focus module 79 keeps track of the application that has focus. Speech service 24 includes a phrase parser 84. Speech engine 22 notifies the phrase parser 84 of any phrases in the sound input that are recognized by the speech engine. As will be described in greater detail below, the phrase parser 84 parses the recognized phrases to determine any arguments that may be required by the handler function that corresponds to the phrase. A function caller 86 calls the handler function 62, 64 with the arguments determined by the phrase parser 86. The function caller calls the handler function 62, 64 using an API, such as remote procedure call (RPC), or the component object model (COM) by Microsoft Inc.

Figure 2:
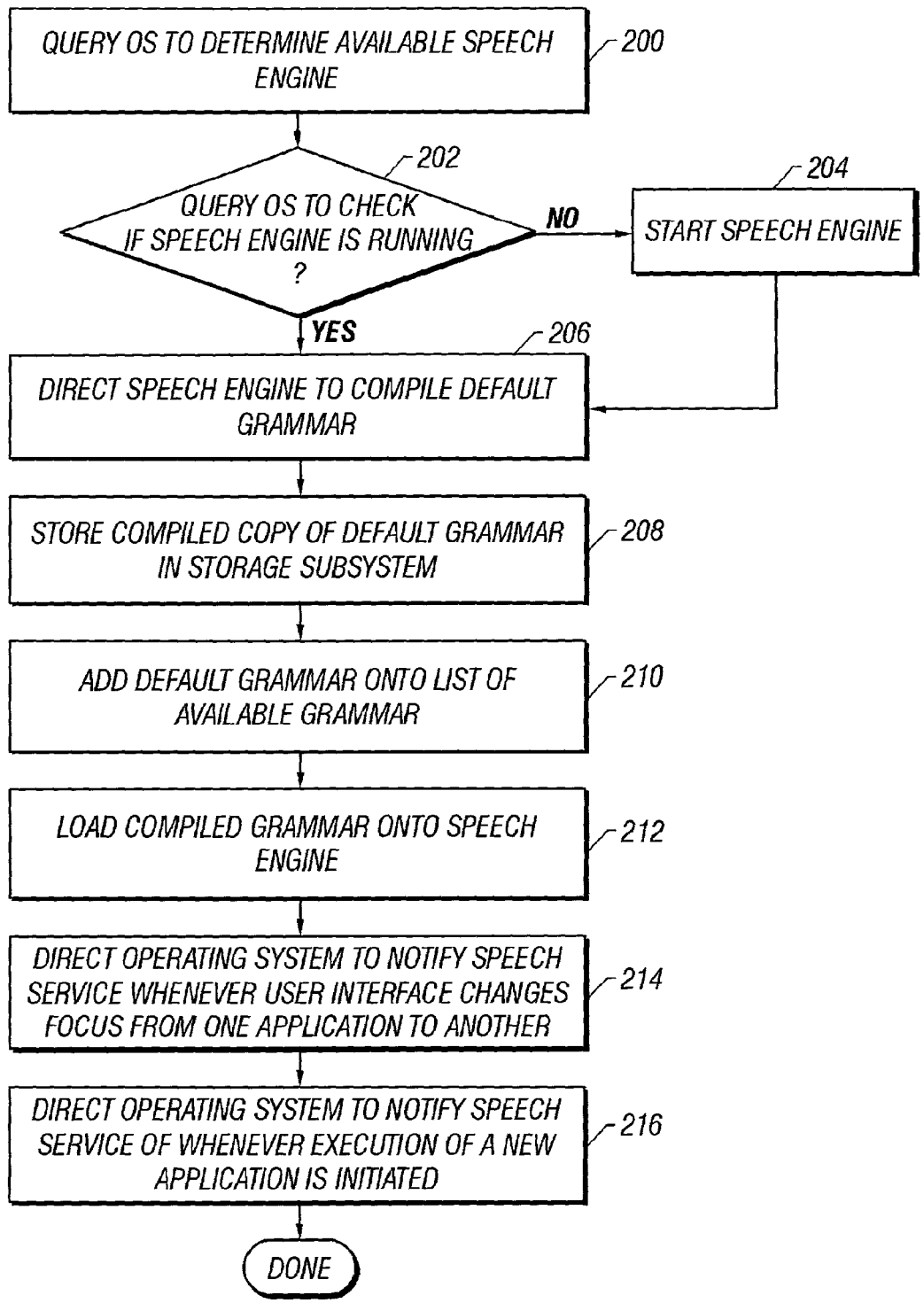
FIG. 2 is a flow chart of the startup process for the speech service software.

As shown in FIG. 2, upon launching the speech service 24, the speech engine launcher 70 queries (200) the operating system 20 to determine whether there is a speech engine 22 installed on the computer 10. The speech engine launcher 70 may query (200) the operating system 20 through the operating system API 44, the system registry 42, or by checking operating system configuration files. The speech engine launcher 70 then queries (202) the operating system 20 to check if the speech engine 22 is running. If the speech engine 22 is not running, the speech engine launcher 70 starts (204) the speech engine 22.

The grammar generator 74 directs (206) the grammar compiler 50 to compile the default grammar. The grammar generator 74 stores (208) the compiled grammar within storage subsystem 18, preferably in a rapidly accessible memory, and adds (210) the default grammar onto a list of available grammars. Grammar loader 80 loads (212) the compiled grammar onto the speech engine 22. Focus module 79 directs (214) the operating system 20 to notify the speech service 24 whenever the user interface 46 changes focus from one application to another. Focus module 79 also directs (216) the operating system 20 to notify the speech service 24 whenever the execution of a new application is initiated.

Figure 3:
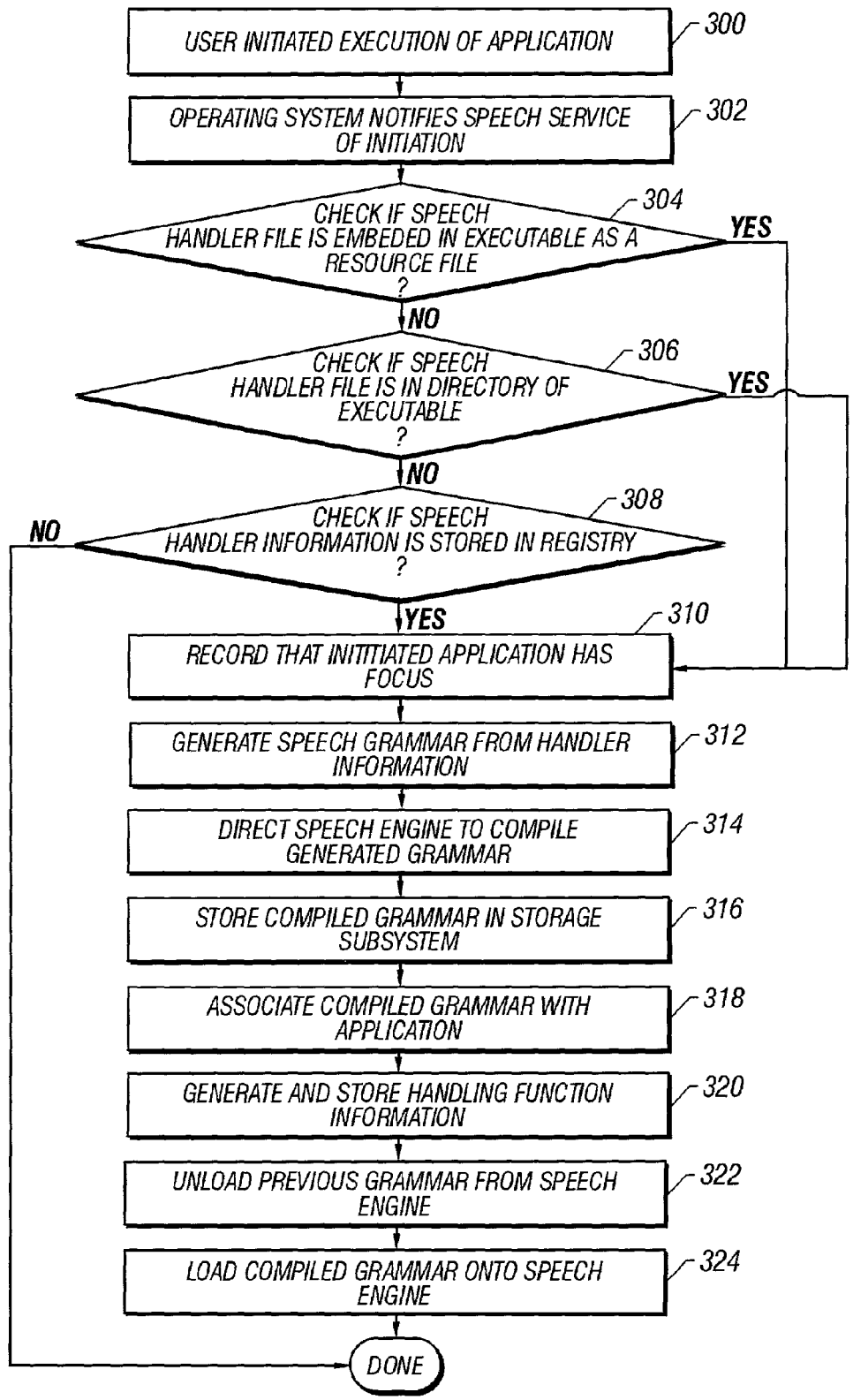
FIG. 3 is a flow chart of the startup process for a speech-enabled application.

As shown in FIG. 3, when a user initiates (300) the execution of an application, for example, by clicking on an icon associated with the application, the operating system 20 notifies (302) the focus module 79. The speech handler file loader 72 then checks (304) if a speech handler file 30, 32 is embedded within the executable of the application as a resource file. If a speech handler file is not embedded within the executable, the speech handler file loader 72 checks (306) if a speech handler file is stored within the same directory as the executable. If a speech handler file is not stored within the directory, the speech handler file loader 72 checks (308) if speech handler information associated with the application is stored within the system registry 42. If the speech handler information is not stored within the registry, the speech handler file loader 72 terminates the process.

The focus module 79 records (310) identity information associated with the initiated application to indicate that the application has focus. The grammar generator 74 generates (312) a grammar from the handler information extracted from either the speech handler file 30, 32 or the registry 42. The grammar generator 74 then directs (314) the speech engine 22 to compile the generated grammar into a compiled grammar 78a, which the grammar generator 74 stores (316) within storage subsystem 18 and associates (318) with the application. Grammar generator 74 also generates and stores (320) handling function information 77a from the handler information. The handling function information associates spoken phrases with handler functions 62, 64 that respond to them.

Grammar loader 80 unloads (322) the grammar on the speech engine 22 and loads (324) the compiled grammar 78a onto the speech engine. Subsequently, all speech input is recognized by the speech engine 22 based on the compiled grammar 78a corresponding to the initiated application. By loading the grammar 78a that is tailored to the application, the speech service 24 causes speech input to be more accurately recognized by the speech engine 22.

Figure 4:
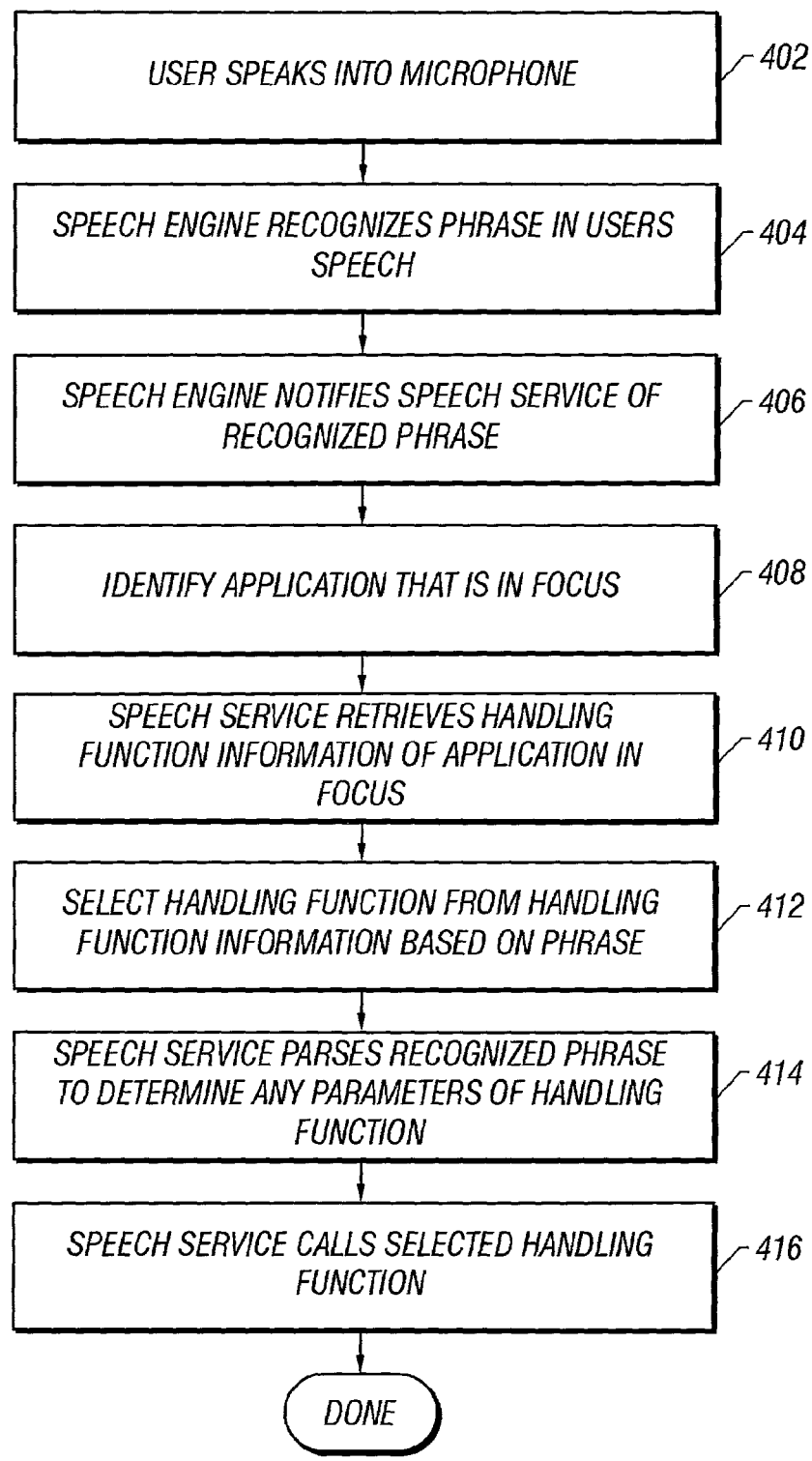
FIG. 4 is a flow chart showing the processing of speech input.

As shown in FIG. 4, when the user speaks (402) into microphone 12, speech engine 22 recognizes (404) phrases contained within the speech and notifies (406) the speech service 24 of the recognized phrase. The speech service 24 identifies (408) the application that has focus by reading identification information previously recorded by the focus module 79. The speech service 24 retrieves (410) handling function information 77a of the application that is in focus and selects (412) a handler function from the information corresponding to the recognized phrase. The phrase parser 84 then parses (414) the phrase to determine any parameter required to call the selected function, as described below with reference to FIG. 5, and then the function caller 86 calls (416) the function.

As shown in FIG. 5, a speech handler file 90 corresponding to a speech-enabled application 26 (FIG. 1) includes phrases 92 to which the application 26 responds and corresponding handler functions 93 that are to be invoked whenever a corresponding phrase is matched.

The phrases 92 include a simple phrase 92a that consists of a single word "jump." The handler function 93a corresponding to the simple phrase 92a is called without any arguments whenever the simple phrase 92a is recognized.

The phrases 92 also include a wildcard phrase 92b that consists of a sub-phrase 94 (i.e., "sendmail to") and a wildcard portion 96 (i.e., *recipient). The speech engine 22 matches the wildcard phrase 92b with any collection of words that begins with the sub-phrase 94. The handler function 93b associated with the wildcard phrase 92b must be called with an argument 98b named "recipient". The name of the argument 98b also occurs in the wildcard portion 96 of the wildcard phrase 92b.

As will be described below, speech engine 22 recognizes a collection of words that matches the wildcard phrase 92b, the phrase parser 84 parses the matching collection of words, extracting any words after the sub-phrase 94 into a variable named "recipient". The speech service then calls the corresponding handler function 93b with the "recipient" variable as the sole argument.

Phrases 92 further include a complex phrase 92c comprising a first part "kick", a wild card for a variable named "person" a second part "in" and a wildcard for a variable named "bodypart." The complex phrase 92c is matched by any collection of spoken words that has both the words "kick" and "in," in that order. The handling function 93c associated with the complex phrase 92c must be called with the variables named "person" and "bodypart."

When the speech engine 22 recognizes any collection of spoken words that match the phrase 92c, the phrase parser 84 parses the collection of words and assigns the words between "kick" and "in" to a variable named "person". The phrase parser 84 also assigns all words after "in" to a variable named "bodypart". The function caller 86 then calls the associated handler function 93c with the variables "person" and "bodypart."

Since the speech handler file 90 does not contain any information that is specific to a particular speech API, the speech engine 24 allows a simple speech application to be used with any speech API version that is compatible with the speech service. The instructions for communicating with the different APIs are embedded in the speech service.

As shown in FIG. 6, when a user changes (600) focus from the first application 26 to the second application 28, the operating system 20 notifies (602) the focus module 79 of the change. The grammar loader 80 then unloads (604) the grammar corresponding to the first application from the speech engine 22 and loads (606) the grammar corresponding to the second application. By loading a grammar that is tailored to the application in focus, the speech service 24 allows the speech engine 22 to recognize phrases in the spoken input more accurately.

Other implementations are within the scope of the following claims.

For example, the speech service may use other means to detect the application that has the focus of the user interface, instead of registering with the operating system to receive notification of a change of focus from one application to another. The speech service may periodically poll the operating system, for example every half-second, to determine whether there has been a change of focus. The polling method may also be used to determine whether the execution of a new application has been initiated.

Alternatively, the speech service may use the compiled grammars to determine the application that is in focus. In this implementation, the speech service combines all the compiled grammars into a composite grammar, which it loads onto the speech engine. When the speech engine recognizes a phrase from the composite grammar, the speech engine notifies the speech service. The speech service in turn parses the recognized phrase and determines which application has a handler function that responds to the recognized phrase. The speech service infers that the determined application is the application that is in focus.

---

```
// CFG for Alpha1 on 23rd June 2000.
// ====================================
// This sample grammar enables the speech engine to recognize commands
// such as the following:
//
//1. "Open Notepad" --> returns: "100" and "Notepad".
//2. "Maximize" --> returns: "202" and "".
//3. "Send e-mail to Russ" --> returns: "303" and "Russ". NB: 303=300+3.
//4. "Share view one" --> returns: "401" and "view1".
//5. "Make a conference call to Rao" --> returns: "506" and "Rao".
//        make a video call to Rao
//        call up the conference center
//6. "Show me the model/data" --> returns: "602/3" and "show".
        "Display chart"
//7. "Exit Notepad" --> returns: "904" and "Notepad".
//--------------------------------------------------
-------------------------------------
// The only parse string rule. This is where everything is controlled from.
    [<Start>]
    <Start> = [opt] (Computer) (OpenCommand) (Program) [opt] (JunkEnd)
    <Start> = [opt] (Computer) (Mail) (emailFriend) [opt] (JunkEnd)
    <Start> = [opt] (Computer) (openMail) [opt] (JunkEnd)
    <Start> = [opt] (Computer) (show) (View) [opt] (JunkEnd)
    <Start> = [opt] (Computer) (Single_video_call)
```

-continued

```
(ComputerName) [opt] (JunkEnd)
    //<Start> = [opt] (Computer) [opt] (OpenCommand)
(Video_conference) (ComputerName) [opt]
    // (ComputerName) and (ComputerName) [opt] (JunkEnd)
    <Start> = [opt] (Computer) (Terminate_call) [opt]
(JunkEnd)
    <Start> = [opt] (Computer) (share) (Running_Application)
[opt] (JunkEnd)
//------------------------------------------------------
------------------------------------
    [(Computer)]
    = please
    = computer[opt] please
    = [opt] computer can you [opt] please
    = [opt] computer would you [opt] please
    = [opt] computer could you [opt] please
    = [opt] computer will you [opt] please
    [(OpenCommand)]
    100=start
    100=run
    100=launch
    100=open
    [(Program)]
    1=[opt]Microsoft Word "winword"
    1=a Word document "winword"
    2=[opt]Microsoft Excel "excel"
    2=an Excel document "excel"
    3=Explorer "explorer"
    4=Notepad "Notepad"
    [(Mail)]
    300= [opt] Begin [opt] a new email to
    300= [opt] Send [opt] a message to
    300= [opt] Compose [opt] a new Message to
    300= Send mail to
    300= Send [opt] an email to
    300= Start [opt] an email to
    300= Compose [opt] an email to
    // 350 open alert mail (in response to a prompt)
    [(OpenMail)]
    350= show email
    350= open message
    350= display the [opt] email message
    350= show the [opt] email message
    // [(Video_conference)]
    //400= a conference with
    //400= a video conference with
    [(Single_video_call)]
    500= [opt] start [opt] make [opt] a video call to
    500= start a video conference with
    500= call
    500= get
    [(Show)]
    600=show [opt] me [opt] the
    600=display [opt] the
    600=bring up [opt] the
    600=open [opt] the
    600=switch [opt] me to [opt] the
    600=I want to see the
    600=go to the
    [(Terminate_call)]
    700 = hangup [opt] netmeeting
    700 = terminate [opt] the call
    700 = end [opt] the call
    700 = end [opt] the conference
    700 = close netmeeting
    700 = close [opt] the conference
    [(Share)]
    800= share [opt] the
    //------------------------------------------------------
------------------------------------
    //
    [(emailFriend)]
    = Steve [opt] Jones "Steve Jones"
    = Sam [opt] Daniels "Sam Daniels"
    = Kim [opt] Thomas "Kim Thomas"
    = Mike [opt] Price "Mike Price"
    [(ComputerName)]
    1=Steve [opt] Jones "Steve"
    2=Sam [opt] Daniels "Sam"
```

-continued

```
    3=Kim [opt] Thomas "Kim"
    4=Mike [opt] Price "Mike"
    [(View) ]
    1=product view "product.one"
    2=sales view "sales.one"
    3=analysis view "channel.one"
    4=default view "personal.one"
    5=personal view "personal.one"
    6= market view "market.one"
    40=product model "gamma3001w.co"
    [(Running_Application)]
    1= desktop "desktop"
    2= product model "gamma3001"
    3= cycore model "gamma3001"
    //------------------------------------------------------
------------------------------------
    // Using numeric-IDs in the 10-thousands, so as to avoid
possible conflicts
    //[(DisplayLocation)]
    //10000= on (screen) one
    //10000= on main (screen)
    //20000= on (screen) two
    //20000= on bottom (screen)
    //30000= on (screen) three
    //30000= on left (screen)
    //40000= on (screen) four
    //40000= on right (screen)
    //[(screen)] //used as a helper rule for DisplayLocation
    //=screen
    //=monitor
    //=area
    //=display
```

What is claimed is:

1. A method comprising:
receiving information about which of a plurality of applications is being currently used;
automatically selecting, based on said information, one among multiple sets of handling information, each set of handling information being associated with a different of said applications and loading a first grammar for a first application based on said automatically selecting where said first grammar is associated with, but separate from, the first application and detecting a change in said information and unloading said first grammar, and loading a second, different grammar for a second application on the speech engine, where said grammar is separate from the second application.

2. A method as in claim 1, wherein said receiving comprises receiving information about a recognized phrase that includes a wildcard portion which is filled in with a parameter from a selected application.

3. The method of claim 1, wherein said recurring information comprises:
identifying an application that is a focus of the recognized phrase, and said automatically selecting being based on the identified application.

4. The method of claim 3 wherein said automatically selecting comprises:
selecting a set of handling information based on the identified application; and
recognizing selecting a handler function from the selected set of handling information based on the recognized phrase.

5. The method of claim 4 further comprising, prior to receiving the recognized phrase:
locating a plurality of sets of handling information.

6. The method of claim 5 further comprising loading the speech engine, the first application, and the second application on a user's computer, and wherein each of the sets of handling information is located when the execution of the associated application is initiated.

7. The method of claim 6 further comprising:
directing an operating system to provide notification whenever the execution of an application is initiated;
wherein each set of handling information is located when the notification is provided.

8. The method of claim 5 further comprising:
detecting a change of the focus from a first application to a second application;
producing the second grammar based on the handling information associated with the second application; and
loading the second grammar onto the speech engine.

9. The method of claim 8 further comprising:
generating an uncompiled grammar based on the handling information; and
compiling the grammar into a binary format.

10. The method of claim 8 further comprising:
directing an operating system to provide notification in response to the focus changing;
wherein the step of determining when the focus changes includes receiving notification from an operating system.

11. The method of claim 8 further comprising:
storing the produced grammar; and
loading the stored grammar onto the speech engine when the focus is changed from a third application to the second application.

12. An article comprising a machine-readable medium which stores machine-executable instructions, the instructions causing a machine to:
receive information about which of a plurality of applications is being currently used; and
select, based on said information, one set of handling information, each set of handling information being associated with a different of said applications and load a first grammar for a first application based on said automatically select, where first grammar is associated with, but separate from the first application and detect a change in said information and unload said first grammar, and load a second, different grammar for a second application on the speech engine, where said grammar is separate from the second application.

13. An article as in claim 12, wherein said receiving comprises receiving information about a recognized phrase that includes a wildcard portion which is filled in with a parameter from a selected application.

14. The article of claim 12, wherein the instruction further cause the machine to:
identify an application that is a focus of the recognized phrase, selecting the handler function being further based on the identified application.

15. The article of claim 14 wherein selecting a handler function comprises:
selecting a set of handling information based on the identified application; and
selecting a handler function from the selected set of handling information based on the recognized phrase.

16. The article of claim 15 wherein the instructions further cause the machine to:
generate an uncompiled grammar based on the handling information; and
compile the grammar into a binary format.

17. The article of claim 15 wherein the instructions further cause the machine, prior to receiving the recognized phrase, to:
locate sets of handling information, each of the sets of handling information being associated with a different application.

18. The article of claim 17 wherein each of the sets of handling information is located when the execution of the associated application is initiated.

19. The article of claim 18 wherein the instructions further cause the machine to:
direct an operating system to provide notification whenever the execution of an application is initiated;
wherein each set of handling information is located when the notification is provided.

20. The article of claim 17 wherein the instructions further cause the machine to:
detect a change of the focus from a first application to a second application;
produce a second grammar based on the handling information associated with the second application; and
load the second grammar onto the speech engine.

21. The article of claim 20 wherein the instructions further cause the machine to:
direct an operating system to provide notification in response to the focus changing;
wherein the step of determining when the focus is changed includes receiving notification from an operating system that the focus has been changed.

22. An apparatus comprising:
a memory which stores computer readable instructions;
a processor which executes the computer readable instructions, the instructions causing the processor to:
receive information about a recognized phrase from a speech engine;
identity an application that is a focus of the recognized phrase; and
select a handler function based on the recognized phrase and the application that is the focus of the phrase and loading a first grammar for a first application based on said select, where said first grammar is separate from the first application, and detecting a change in said information and unloading said first grammar, and loading a second, different grammar for a second application on the speech engine, where said second grammar is separate from the second application.

23. An apparatus as in claim 22, wherein the processor receives the information about the recognized phrase, that includes a wildcard portion which is filled with a parameter from a selected application.

24. The apparatus of claim 22 wherein selecting a handler function comprises:
selecting a set of handling information based on the identified application; and
selecting a handler function from the selected set of handling information based on the recognized phrase.

25. The apparatus of claim 24 wherein the instructions further cause the processor to:
generate an uncompiled grammar based on the handling information; and
compile the grammar into a binary format.

26. The apparatus of claim 24 wherein the instructions further cause the processor, prior to receiving the recognized phrase, to:
locate sets of handling information, each of the sets of handling information being associated with a different application.

27. The apparatus of claim 26 wherein each of the sets of handling information is located when the execution of the associated application is initiated.

28. The apparatus of claim 27 wherein the instructions further cause the processor to:
   direct an operating system to provide notification whenever the execution of an application is initiated;
   wherein each set of handling information is located when the notification is provided.

29. The apparatus of claim 26 wherein the instructions further cause the processor to:
   detect a change of the focus from a first application to a second application;
   produce a second grammar based on the handling information associated with the second application; and
   load the second grammar onto the speech engine.

30. The apparatus of claim 29 wherein the instructions further cause the processor to:
   direct an operating system to provide notification in response to the focus changing;
   wherein the step of determining when the focus is changed includes receiving notification from an operating system that the focus has been changed.

* * * * *